(12) United States Patent
Mah (10) Patent No.: US 11,844,406 B1
(45) Date of Patent: Dec. 19, 2023

(54) REUSABLE STORAGE WRAP AND PLACEMAT

(71) Applicant: Scrubza, LLC, Catonsville, MD (US)

(72) Inventor: Jason Mah, Catonsville, MD (US)

(73) Assignee: SCRUBZA, LLC, Catonsville, MD (US)

( * ) Notice: Subject to any disclaimer, the term of this patent is extended or adjusted under 35 U.S.C. 154(b) by 0 days.

(21) Appl. No.: 18/447,124

(22) Filed: Aug. 9, 2023

Related U.S. Application Data (60) Provisional application No. 63/445,185, filed on Feb. 13, 2023.

(51) Int. Cl.
*A45C 11/20* (2006.01)
*B65D 75/14* (2006.01)
(Continued)

(52) U.S. Cl.
CPC .......... *A45C 11/20* (2013.01); *A47G 23/0303* (2013.01); *B65D 65/06* (2013.01); *B65D 75/14* (2013.01)

(58) Field of Classification Search
CPC ... A45C 11/20; A45C 7/00; A45C 2007/0004; A45C 2007/0013; A47G 23/0303
(Continued)

(56) References Cited

U.S. PATENT DOCUMENTS

| | | | |
|---|---|---|---|
| 258,844 A | 5/1882 | Young | |
| 588,587 A | 8/1897 | Locke | |

(Continued)

FOREIGN PATENT DOCUMENTS

CA 349496 A 4/1935

OTHER PUBLICATIONS

Incley Folding Dinner Plates, first available Nov. 4, 2022, Amazon, [online], [site visited Aug. 30, 2023], Available from internet URL: https://www.amazon.com/incley-Reusable-Container-Collapsible-Silicone/dp/B0BLG8P72D (Year: 2022).
(Continued)

*Primary Examiner* — Javier A Pagan
(74) *Attorney, Agent, or Firm* — Oliver Edwards; Law Office of Oliver Edwards LLC (57) ABSTRACT

A container assembly which is especially adaptable to form a final presentation enclosure is constructed from a flat blank of material, optionally having fold lines delineating a bottom, side, and top wall portions which act in conjunction with one another to enclose a space. The side walls may be connectable by joining portions constituting bellows-type folding members. From flat, the container is constructed by folding. Joining members are folded inwardly thereby drawing up respective side walls to which they are attached. The top walls are formed so as to be exposed at the top of the container to allow securing of the top wall portions by any suitable means. There is also provided a variable volume container by means of the joining members which extend into the interior of the container. The joining members act to center and protect a smaller item within the container or can be completely moved to make available the total volume of the container.

20 Claims, 9 Drawing Sheets

(51) Int. Cl.
*B65D 65/06* (2006.01)
*A47G 23/03* (2006.01)

(58) Field of Classification Search
CPC ........ B65D 65/00; B65D 65/02; B65D 65/04;
B65D 65/06; B65D 65/08; B65D 65/10;
B65D 65/12; B65D 2501/24904
See application file for complete search history.

(56) References Cited

U.S. PATENT DOCUMENTS

| | | | | |
|---|---|---|---|---|
| 1,172,204 | A | * | 2/1916 | Gerhardstein ....... A45C 7/0059 |
| | | | | 229/87.08 |
| 1,474,826 | A | * | 11/1923 | Hudec .................... B65D 65/08 |
| | | | | D19/3 |
| 1,683,678 | A | * | 9/1928 | Kitterman ................ A45C 3/00 |
| | | | | 383/22 |
| D122,523 | S | | 9/1940 | Schwartzman |
| 2,436,237 | A | * | 2/1948 | Brandt ..................... A45C 3/06 |
| | | | | 150/105 |
| 3,024,824 | A | * | 3/1962 | Bass ..................... D06F 95/004 |
| | | | | 294/149 |
| 3,623,526 | A | | 11/1971 | Robertson |
| 3,683,987 | A | | 8/1972 | Robertson |
| D236,657 | S | | 9/1975 | Reeves |
| D262,177 | S | | 12/1981 | Swan |
| D265,038 | S | | 6/1982 | Tomasi |
| 4,562,952 | A | | 1/1986 | Chinman |
| D289,228 | S | | 4/1987 | Chinman |
| D699,079 | S | | 2/2014 | Lloyd |
| D738,744 | S | | 9/2015 | Sanders |
| D841,484 | S | | 2/2019 | Hill |
| D903,761 | S | | 12/2020 | Hill |
| D959,282 | S | | 8/2022 | Neal |
| 2006/0131310 | A1 | | 6/2006 | Lau |
| 2007/0122599 | A1 | | 5/2007 | Furlong |
| 2010/0127052 | A1 | | 5/2010 | Uyehara |
| 2017/0166371 | A1 | | 6/2017 | Sumera et al. |
| 2017/0349345 | A1 | | 12/2017 | McNicholas et al. |

OTHER PUBLICATIONS

Wrap-N-Mat, Extra Large, Reusable Food Wrap and Placemat, Amazon, [online], [site visited Aug. 30, 2023], Available from internet URL; https://us.amazon.com/Wrap-N-Mat-Extra-Reusable-Placemat-Gingham/dp/b004ITMBDI (Year: 2023).

* cited by examiner

REUSABLE STORAGE WRAP AND PLACEMAT

BACKGROUND OF INVENTION

Field of the Invention

The present invention relates to a reusable, fastenable food storage product that is an alternative to products such as single-use sandwich bags, Ziploc®-type plastic bags, and coated fabric wraps.

Description of Related Art

Food storage devices are some of the oldest artifacts in recorded history as found in ancestral clay and ceramic pots. And for good reason as it was meant to help humans store, preserve, and cook/process food. Some attributes pertinent to food storage are as follows.

Preservation vs. ease of use. Storing food for preservation typically relies on sealing the food in airtight containers to minimize bacterial/mold exposure or dehydration. Seals may be strong enough to hold a vacuum or simple semi-air permeable seals like saran wrap or cloth linen. The strength of the seal often correlates to the ease of access to the container—the more rigorous the sealing, the harder the containers are to open and close.

Wet vs. Dry. Storage containers can store both wet, dry or both types of foods. Wet foods such as spaghetti with sauce can stain certain plastics and other container materials.

Presentation. Certain containers focus on presentation as opposed to pure storage. These containers are often bowl or bowl/plate combinations with lids. Parties and banquets are typical occasions for these types of containers. The lids on such containers are typically large and have a loose fitting lid due to the large diameter. Storing large lids with the containers is often cumbersome.

Reheating. Ceramic, glass, metal, certain plastics, and silicone materials are great at being reheated. Nonconductive materials such as plastics, ceramic, glass, and silicone can be reheated in the microwave. However, some consumers may avoid microwaving plastics to avoid risk of plasticizers and undesirable compounds possibly contaminating food.

Storability full and empty. Consumers need a way to store empty containers when not in use. If containers cannot nest inside each other, they take up unnecessary space. Nestable containers take up less space and keep the containers better organized. Containers that use lids have two problems: 1) storing the lid and 2) coordinating the lid with the container if the lids are container size specific.

Manufacturing processes. Ceramic, glass, and metal containers with separate lids, can have lids with different materials. While ceramic and glass containers can use a lid composed with similar materials, to be securable, they often require plastic snaps. A pure gravity-based lid of ceramic or glass works well in cooking, but often not in storage and stacking as their oven proof handles on the top often interfere with stacking. Metal containers can have metal lids that snap or screw on. Snaps, as found in common tiffin containers, however, require additional welding points which add to production time and cost. Screw-on lids will not seal well unless there is a soft gasket to help seal the lid.

Cost. Raw materials, production, transportation, and packaging are some of the main drivers of cost.

Viewability and labeling. Viewing the contents of the container without opening it is a bonus. Glass and transparent plastics/silicone have this advantage.

Vacuum seal and containment. To aid in preservation, containers can hold a vacuum. A whole ecosystem of specialty tops designs to suck the air out via various compressors have been developed for glass canning jars.

Food products must be protected against contamination and many products must have limited oxygen exposure; some must be prevented from either drying out (in the case of moist products such as cheese) or from picking up moisture from the outside environment (in the case of dry products such as sandwiches, crackers or cookies). One common and inexpensive form of storage is the single-use plastic food storage bag for keeping food fresh for a desired period of time. These plastic storage bags are beneficial to keeping food fresh, as well as for allowing food to be transported from one place to another without spilling, leakage, or contamination.

However, one problem with plastic food storage bags is their harmful effect on the environment as most are disposed of after one use and not recycled. Each day, millions of plastic food storage bags end up in landfills or in waterways where fish and other marine life may eat the debris and damage their health or die. Plastic food storage bag debris wreaks havoc on wildlife, pollutes beaches, and enters our food chain.

Plastic food storage bags are typically made from polyethylene, a plastic that may take hundreds of years to decompose in a landfill. Most plastic food storage bags do not biodegrade though some can photodegrade into smaller and smaller toxic bits that can contaminate soil and waterways. Recycling of plastic food storage bags tends to be expensive and produce lower-quality plastics.

In addition to these plastic food storage bags, plastic storage containers, such as Rubbermaid® containers are also available to store and transport food. These plastic containers may be reused and washed; however, these plastic food containers tend to be bulky, inflexible, and more expensive when compared to plastic food storage bags and do not offer the same ease of use and flexibility.

Reusable wraps made with plastic- or wax-coated cloth are often of limited durability and/or not dishwasher safe.

Some dishwasher safe containers are not dishwasher friendly because they have not been optimized to be cleaned in the dishwasher. Many of the bag designs are sealed on three sides with a zip mouth enclosure on the fourth side. The mouth is often narrow, restricting water circulation and flow. The zip lock design additionally has narrow channels that easily trap food remains and particles.

U.S. Pat. No. 1,687,678 issued Oct. 16, 1928, to Mallory discloses an inexpensive cardboard or paper food package, discardable after use and capable of being folded from a flat blank to a six-sided box of preset dimensions. Overlapping slot features allow the box to be secured in a closed configuration by weaving, for example, a spoon or fork through the slots. Mallory's material selection makes the package a poor candidate for manual washing or in a dishwasher, inhibiting reuse and creating waste attendant to single-use packaging, Moreover, Mallory's preset box dimensions means that different-sized blanks are needed to accommodate variations in food sizes. Mallory's box also cannot be self-secured in a closed configuration as it requires a utensil for securement.

U.S. Pat. No. 3,391,782 issued Jul. 9, 1968, to Kaspar discloses an inexpensive paperboard or polystyrene convertible food package, discardable after use and especially adapted for carry-out operations. Kaspar's package is folded from a flat blank to a six-sided box of preset dimensions. Locking tongues and tab and slot features allow the box to be secured in a closed configuration. Alternatively, the box may be configured in an open-end configuration, though any food item in the box must be removed to switch between the two configurations. Kaspar's materials selection makes the package a poor candidate for manual washing or in a dishwasher, inhibiting reuse and creating waste attendant to single-use packaging, Moreover, Kaspar's preset box dimensions means that different-sized blanks are needed to accommodate variations in food sizes.

U.S. Pat. No. 11,033,127 issued Jun. 15, 2021, to Floyd-Vester et al. discloses a picnic-size container that converts into a square mat. Floyd-Vester teaches that the container is secured in a closed configuration of fixed dimensions with zippers, clips, or hook/loop fasteners. The container can be machine washable and can comprise multiple layers such as an outer shell made of neoprene and a lining made of nylon or neoprene fabric. In its closed configuration, the portions of the inner lining free from the side panels must be folded into the interior of the container, thereby occupying container space. Floyd-Vester's container requires many manufacturing steps and multiple materials and fasteners.

In response to these problems with plastic food storage bags, plastic storage containers, paper, paperboard, and coated fabric wraps and in accordance with the present invention, a reusable food/article storage wrap is provided. In one aspect, the present invention provides such a fastenable food storage wrap that is made of food-safe and food-proof material. In one aspect, the wrap may lie flat and serve as a placemat or a large flat eating surface.

This disclosure is especially concerned with such wraps for perishable products, wherein the packages include a fastening feature and are washable and reusable.

SUMMARY OF INVENTION

In respect of the food storage attributes discussed above, the present invention relates to casual or temporary food storage and may restrict airflow to foods, while not strictly airtight or hermetically sealable. In this way, easy accessibility and the added function of a large prep and eating mat are provided. In aspects of the invention, there is a unique presentation via a lay flat appearance—not requiring a detachable lid for closure. In embodiments of the invention made of silicone, it can be used in microwave reheating. Heating in a convection oven is also possible as high as 220 Celsius. In some embodiments, silicone that can be made transparent is used.

In aspects of the invention, there is an advantage over lidded food containers because there is no lid to lose. Embodiments of the invention, when empty, take minimal space if hung flat by one of the many buttonholes. While not technically "nestable" as it doesn't fit inside itself, embodiments can pack flat against each other in a hanging or horizontal position. Embodiments of the invention may be made from a single injection molded operation which allows it to be made quickly without assembly labor. One aspect of single injection mold construction is that additional manufacturing materials and steps are not typically required. This greatly reduces the labor cost and complexity involved in manufacturing. Moreover, embodiments of the invention ship in bulk compactly, additionally minimizing cost.

One aspect of the present invention provides a reusable food or other article storage container; the container can open flat and fold inwardly on itself to enclose food or other articles. While fully open, it can serve as a placemat for eating or prepping food or act as a staging/organizing area for other articles. In one embodiment, there is a rectangular or square base where the food/object may be placed; a panel extends from each edge of the base. The panels may fold on top of the base to completely enclose the food/object. In other embodiments, other numbers of panels may be used to enclose an article.

In some aspects, the embodiments described herein relate to a fastenable wrap for food or other article including: an elastomeric sheet configured to lay substantially flat on a flat surface when the wrap is in an open configuration, the sheet having inside and outside surfaces, the sheet further having: a substantially rectangular central section bounded by north, east, south, and west edges; a south section contiguous to the south edge of the central section, the south section having a shank disposed distal to the central section and extending away from the outside surface and a button disposed at a distal end of the shank; a north section contiguous to the north edge of the central section, the north section having three eyelets disposed increasingly distally to the central section; an east section contiguous to the east edge of the central section, the east section having two eyelets disposed increasingly distally to the central section; a west section contiguous to the west edge of the central section, the west section having two eyelets disposed increasingly distally to the central section; a northeast section contiguous to the north and east sections; a southeast section contiguous to the south and east sections; a southwest section contiguous to the south and west sections; a northwest section contiguous to the north and west sections; wherein each said eyelet is sized to be elastically deformable over the button and sized to fit onto the shank and be captured around the shank between the button and the outside surface of the south section; and wherein the wrap is configured to be fastened in a closed configuration around the food or other article by placing the food or other article on the inside surface of the central section, folding the south section over article, folding the east section over the central section and slipping one of the east section eyelets over the button, folding the west section over the central section and slipping one of the west section eyelets over the button, and folding the north section over the central section and slipping one of the north section eyelets over the button.

In some aspects, the embodiments described herein relate to a fastenable wrap further including imprinted indicia of folding sequence and direction proximate to the south edge of the south section, proximate to the eyelets of each of the north, west, and east sections.

In some aspects, the embodiments described herein relate to a fastenable wrap for food or other article including: an elastomeric sheet configured to lay substantially flat on a flat surface when the wrap is in an open configuration, the sheet having inside and outside surfaces, the sheet further having: a substantially rectangular central section bounded by north, east, south, and west edges; a south section contiguous to the south edge of the central section, the south section having a shank disposed distal to the central section and extending away from the outside surface and a button disposed at a distal end of the shank; a north section contiguous to the north edge of the central section, the north section having at least one eyelet disposed distally to the central section; an east section contiguous to the east edge of the central section, the east section having at least one eyelet disposed distally to the central section; a west section contiguous to the west edge of the central section, the west section having at least one eyelet disposed distally to the central section; a northeast section contiguous to the north and east sections; a southeast section contiguous to the south and east sections; a southwest section contiguous to the south and west sections; a northwest section contiguous to the north and west sections; wherein each said eyelet is sized to be elastically deformable over the button and sized to fit onto the shank and be captured around the shank between the button and the outside surface of the south section; and wherein the wrap is configured to be fastened in a closed configuration around the food or other article by placing the food or other article on the inside surface of the central section, folding the south section over article, folding the east section over the central section and slipping one of the east section eyelets over the button, folding the west section over the central section and slipping one of the west section eyelets over the button, and folding the north section over the central section and slipping one of the north section eyelets over the button.

In some aspects, the embodiments described herein relate to a fastenable wrap wherein the sheet has a general uniform thickness and the sheet has a thicker thickness than the general uniform thickness proximal to the eyelets and shank.

In some aspects, the embodiments described herein relate to a fastenable wrap wherein the sheet has a general uniform thickness and the sheet has a thinner thickness than the general uniform thickness in areas proximal to sheet fold lines as defined by linear extensions of the east, west, north, and south edges of the central section, excepting intersections of said fold lines with each other and edges of the sheet.

In some aspects, the embodiments described herein relate to a fastenable wrap wherein the sheet has a thickness thinner than the general uniform thickness in areas proximal to sheet fold lines as defined by linear extensions of the east, west, north, and south edges of the central section, excepting intersections of said fold lines with each other and edges of the sheet. In some aspects, the embodiments described herein relate to a fastenable wrap further including imprinted indicia of folding sequence and direction proximate to the south edge of the south section, proximate to the eyelets of each of the north, west, and east sections.

In some aspects, the embodiments described herein relate to a fastenable wrap wherein the general thickness is approximately 1 mm, the thinner thickness is approximately 0.5 mm, and the thicker thickness is approximately 1.5 mm. In some aspects, the embodiments described herein relate to a fastenable wrap wherein the thickness thinner than the general uniform thickness in areas proximal to sheet fold lines includes channels 0.28-0.32 cm in width. In some aspects, the embodiments described herein relate to a fastenable wrap including silicone rubber. In some aspects, the embodiments described herein relate to a fastenable wrap wherein the eyelets are ovoid. In some aspects, the embodiments described herein relate to a fastenable wrap wherein the central section is approximately 16-18 cm on each of its north, east, south, and west edges. In some aspects, the embodiments described herein relate to a fastenable wrap wherein the button includes a tab. In some aspects, the embodiments described herein relate to a fastenable wrap wherein the tab has grip ridges. In some aspects, the embodiments described herein relate to a fastenable wrap including molded advertising on a surface thereof.

In some aspects, the embodiments described herein relate to a fastenable wrap wherein the eyelets, button, and shank are configured to audibly and kinesthetically snap when one of the eyelets is slipped over the button and onto the shank.

In some aspects, the embodiments described herein relate to a fastenable wrap formed of silicone rubber and having a tensile strength of at least 7.5 Mpa, a Tear Strength, DieC of at least 12 Kgf/cm, and a plasticity in the range of 205-235. In some aspects, the embodiments described herein relate to a fastenable wrap formed of silicone rubber and having at least one of the following characteristics: a tensile strength of at least 7.5 Mpa, a Tear Strength, DieC of at least 12 Kgf/cm, and/or a plasticity in the range of 205-235.

DETAILED DESCRIPTION

Figure 1:
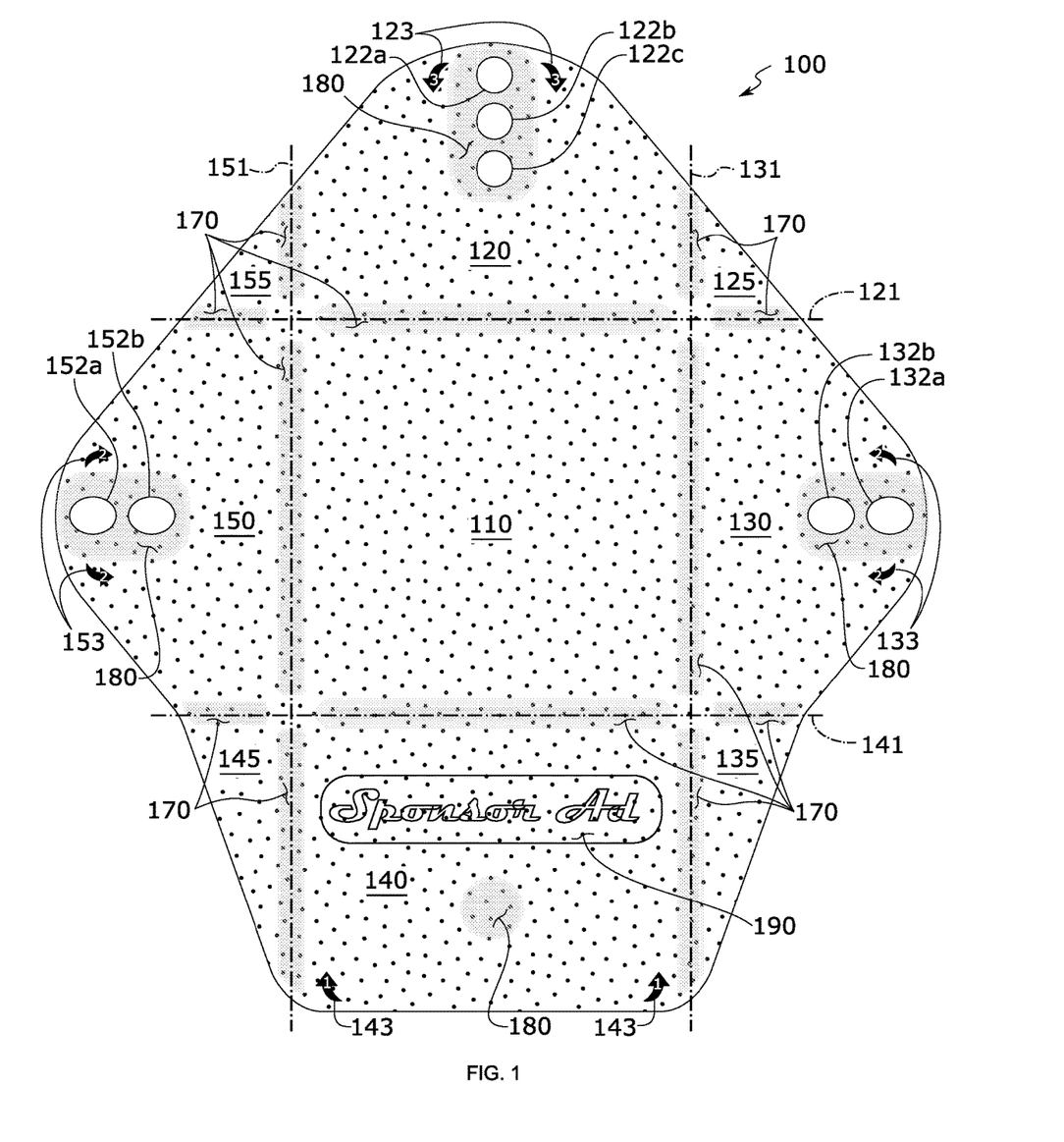
FIG. 1 illustrates a plan view of an "inside" surface of an exemplary embodiment of the invention.
Figure 2:
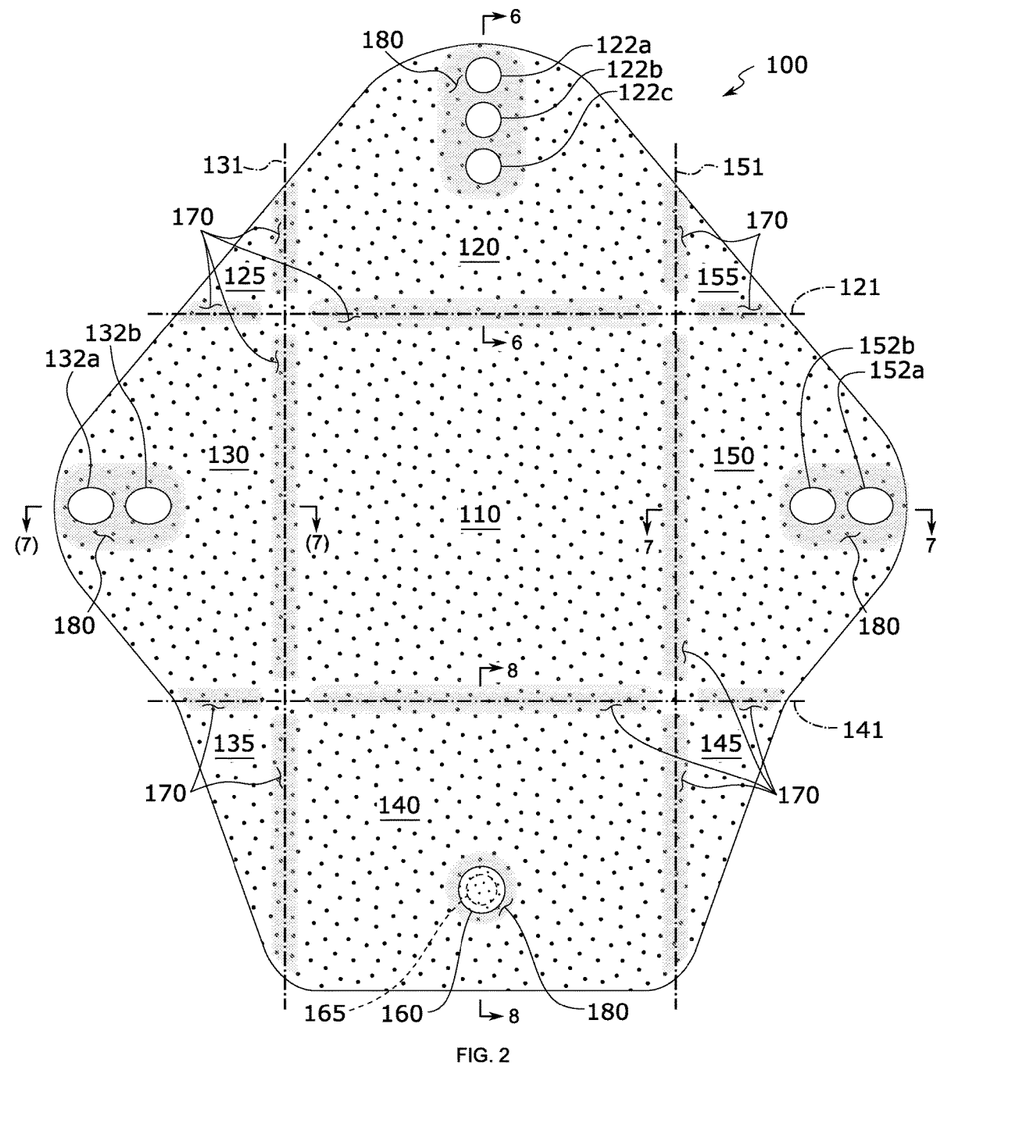
FIG. 2 illustrates a plan view of an "outside" surface of an exemplary embodiment of the invention.
Figure 3:
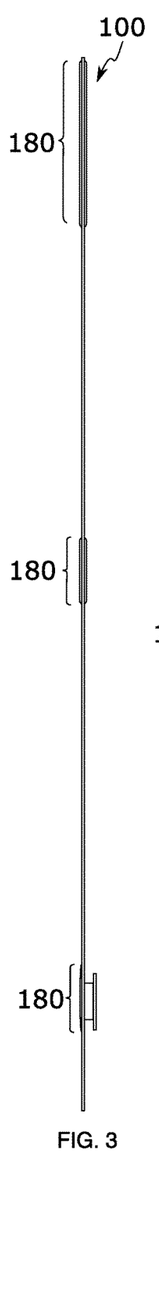
FIGS. 3-5 illustrate edge views of an exemplary embodiment of the invention from the "east," "south," and "north," respectively.
Figure 4:
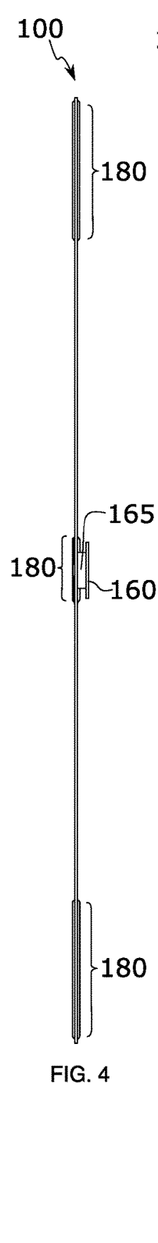
Figure 5:
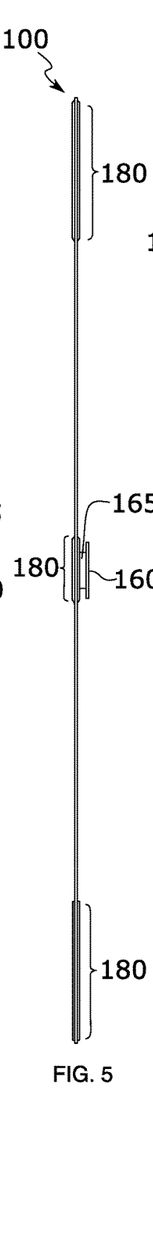

With reference to FIGS. 1 and 2, respectively, plan views of inside and outside surfaces of an embodiment of the present invention, a wrap 100 comprising an elastomeric sheet material is provided. The shape of wrap 100 approximates a diamond-shaped sheet with one apex truncated and the others rounded. Wrap 100 may be comprised of several sections including a roughly rectangular central section 110. With respect to the "inside" view shown in FIG. 1, contiguous to central section 110 on its upper, right, lower, and left edges are, respectively, a north section 120, an east section 130, a south section 140, and a west section 150. Contiguous to the edges of north section 120 and east section 130 is northeast section 125. Contiguous to the edges of south section 140 and east section 130 is southeast section 135. Contiguous to the edges of south section 140 and west section 150 is southwest section 145. Contiguous to the edges of north section 120 and west section 150 is northwest section 155.

In a preferred embodiment, northwest section 155, north section 120, and northeast section 125 roughly form a triangle. Likewise, northeast section 125, east section 130, and southeast section 135 roughly form a triangle. Likewise, northwest section 155, west section 150, and southwest section 145 roughly form a triangle. In this manner wrap 100 provides for closure and avoidance of air gaps while not using more elastomeric material than necessary. In this embodiment, south section 140 is substantially rectangular to provide substantial coverage of the enclosed item upon the first fold. In a preferred embodiment, central section 110 is sized to at least fit a typical sandwich and the east-west width of each of east section 130 and west section 150 are roughly 60%±5% of the east-west width of central section 110. The north-south height of south section 140 is roughly 80%±5% of the north-south height of central section 110. The north-south height of north section 120 is roughly 70%±5% of the north-south height of central section 110. In a preferred embodiment, section 110 measures 16-18 cm on each of its north, east, south, and west edges.

Wrap 100 comprises features for fastening the wrap in a closed configuration. With reference to FIGS. 2-5, 8, 10-17, a button 160 is connected to the sheet of wrap 100 at the distal end of a shank 165 extending away from the outside surface of south section 140. Distal to central section 110 are one or more eyelets in each of west section 150, north section 120, and east section 130. In the depicted embodiments, west section 150 has west eyelet 152b and west eyelet 152a, increasingly distal from central section 110; east section 130 has east eyelet 132b and east eyelet 132a, increasingly distal from central section 110; and north section 120 has north eyelet 122c, north eyelet 122b, and north eyelet 122a, increasingly distal from central section 110. Other embodiments within the scope of the invention may have fewer or more eyelets in each of west section 150, north section 120, and east section 130. Generally, each of the eyelets comprises a through-open space in the sheet of wrap 100 that is at least as large as the cross section of shank 165 and shaped to fit over shank 165 without bunching. Eyelets are generally not larger than the cross section of button 160 though an eyelet could be larger than the cross section of button 160 in a given dimension so long as the cross section of button 160 would overlap at least some part of a given eyelet when the given eyelet is disposed over shank 165. Though the exemplary embodiments depict generally circular or ovoid eyelets and a shank 165 cross-section that is circular, the eyelets and the cross section of shank 165 may have alternative shapes, subject to the noted constraints. In a preferred embodiment, shank 165 is 1.5 to 1.6 cm in diameter and button 160 has a cross section that is at least a circle 2 cm in diameter. Button 160 should not be so large as to exceed the ability of any of the elastomeric eyelets to resiliently expand over it. In a preferred embodiment, eyelets are ovoids approximately 1.9 cm in the east-west direction and 1.4 to 1.5 cm in the north-south direction. In some embodiments, eyelets are radiused in the thickness dimension. See, for example, cross sectional FIGS. 6 and 7 showing slightly radiused eyelets 122a, 122b, 122c, 132a, 132b, 152a, and 152b.

The sheet of wrap 100 is of a general uniform thickness such that the chosen sheet material can flexibly fold over food and other articles while maintaining durability in use and maintenance. In a preferred embodiment, the sheet is approximately 1 mm in thickness, except as further noted here. In some embodiments, the edge of wrap 100 is radiused. See, for example, the right edge of cross-sectional FIG. 15.

Certain areas 180 of the sheet of wrap 100, proximate to the eyelets and shank 165, may include areas of increased thickness to enhance durability. In one embodiment, increased thickness is achieved by a raised land such as raised land 157 on the inside surface of section 150 and raised land 158 on the outside surface of section 150 (see FIGS. 11 and 12). Increased thickness in areas 180 can be achieved by lands on the inside, outside, or both surfaces of wrap 100. In a preferred embodiment, areas of increased thickness are approximately 150% of the general thickness of wrap 100.

Figure 6:
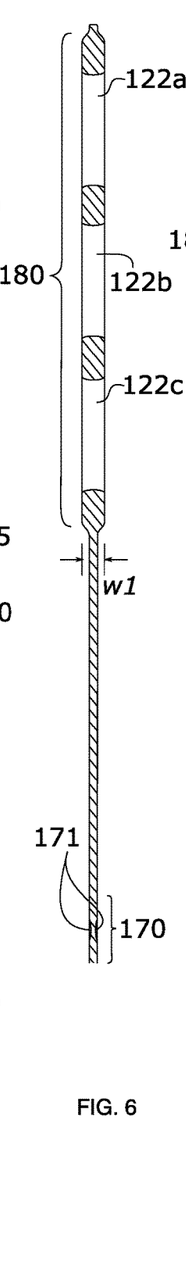
FIG. 6 illustrates a side edge sectional view of an exemplary embodiment of the invention taken along cut line 6-6 shown in FIG. 2.
Figures 7, 8:
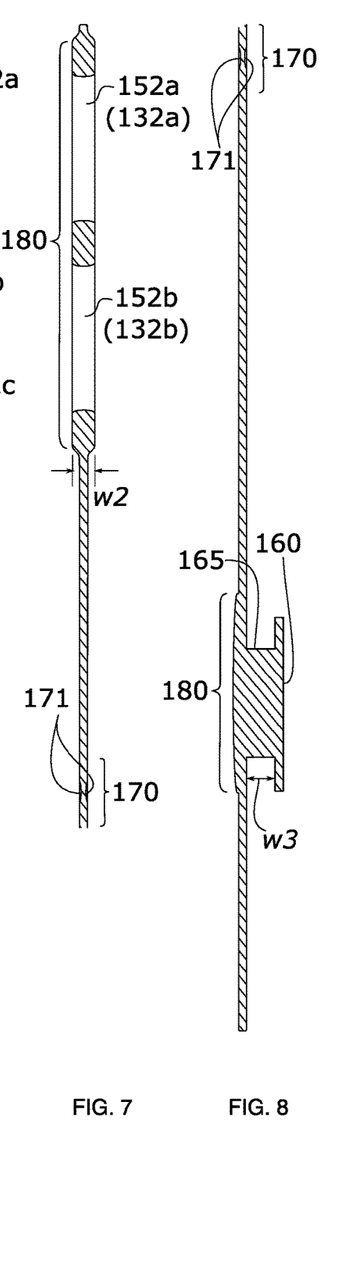
FIG. 7 illustrates a "south" edge sectional view of an exemplary embodiment of the invention taken along cut line 7-7 and in east-west mirror symmetry along cut line (7)-(7) shown in FIG. 2.
FIG. 8 illustrates an edge sectional view of an exemplary embodiment of the invention taken along cut line 8-8 shown in FIG. 2.

With reference to FIGS. 6-8, the thickness of the wrap may be designated w1 proximate to the north eyelet(s) and w2 proximate to the east and west eyelets. The height w3 of shank 165 would be computed as w1+2×w2.

Certain areas 170 of the sheet of wrap 100, proximate to north fold line 121, east fold line 131, south fold line 141, and west fold line 151, may include areas of decreased thickness to aid folding along said fold lines. In one embodiment, decreased thickness is achieved by channels such as channels 171 on the inside and outside surfaces of wrap 100 (see cross sectional views in FIGS. 6-8 and three annotated such channels 171 in FIG. 9). In preferred embodiments, thicknesses in areas 170 is decreased to not less than 50% of the general thickness. In preferred embodiments, channels such as channels 171 may be 0.28-0.32 cm in width with their side walls slightly chamfered. Areas 170 do not run to edges of wrap 100 nor into intersections of fold lines 121, 131, 141, or 151 to mitigate risk of failure arising from tearing, repetitive strain, and contact abrasion. Decreased thickness in areas 170 can be achieved by channels in the inside, outside, or both surfaces of wrap 100.

Figure 9:
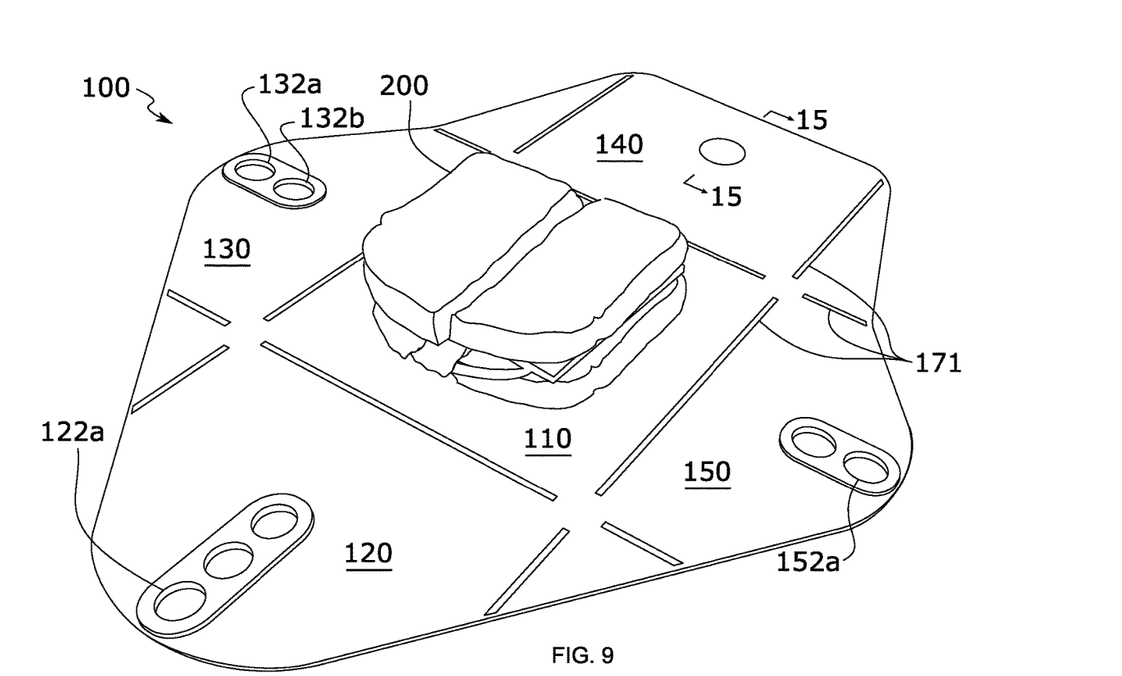
FIGS. 9-14 illustrate perspective views of an exemplary embodiment progressively enclosing an article of food.
Figure 10:
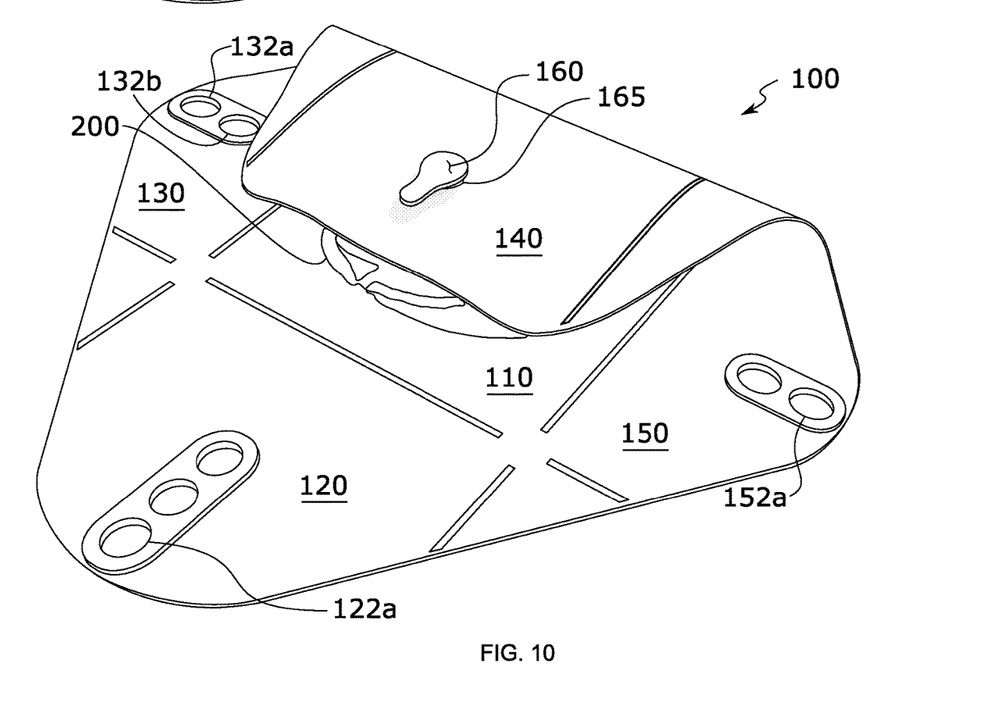
Figure 11:
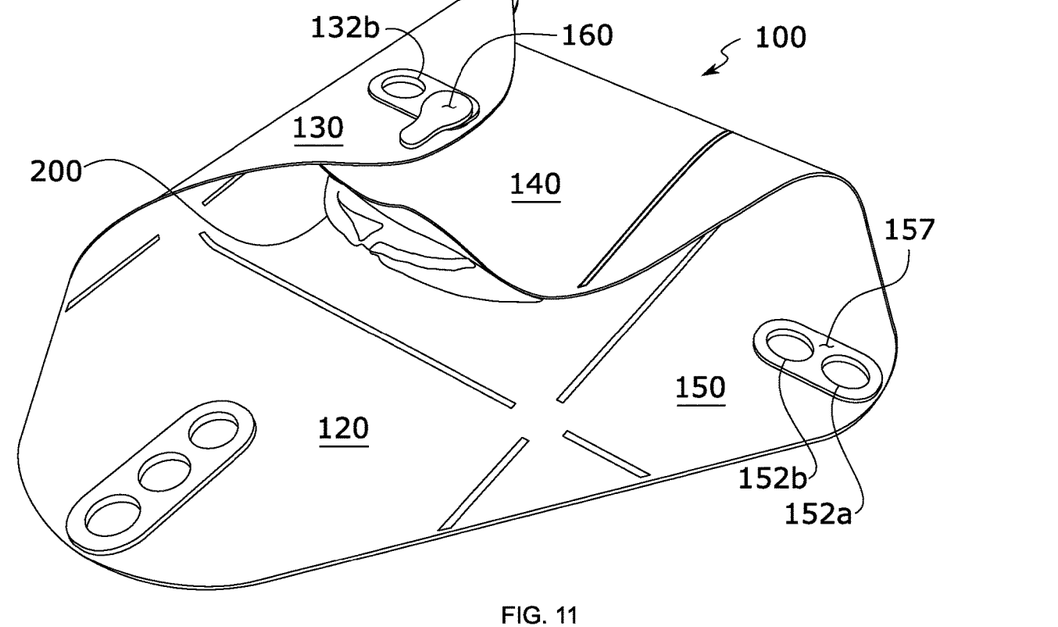
Figure 12:
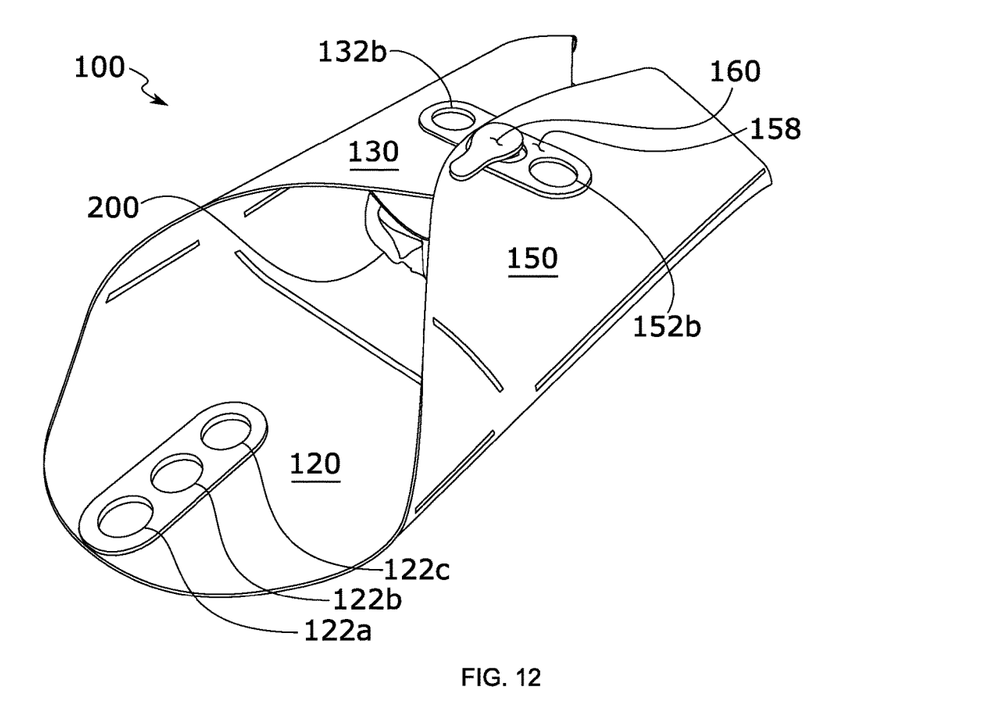
Figures 13, 14:
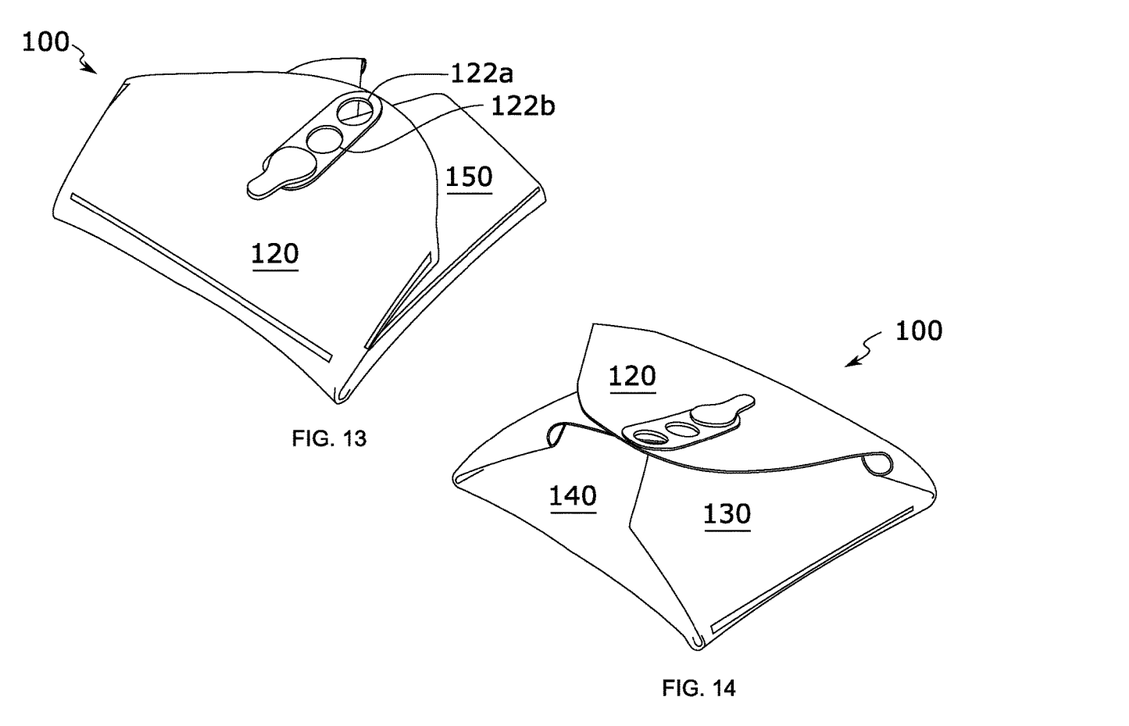
Figure 15:
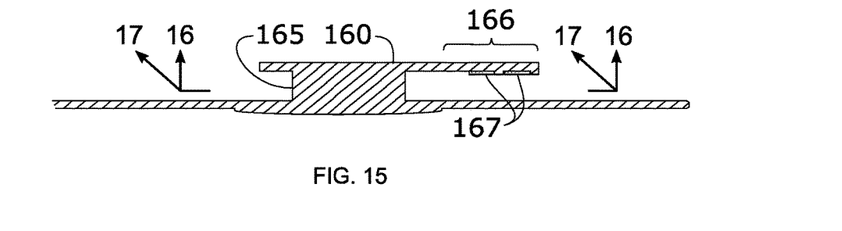
FIG. 15 is a cross sectional view taken along cut lines 15-15 shown in FIG. 9.
Figure 16:
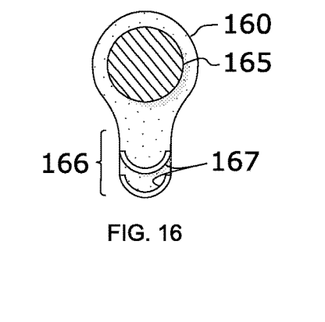
FIG. 16 is a plan view of shank 165 and button 160, the shank cut at cut line 16-16 and view direction shown in FIG. 15.
Figure 17:
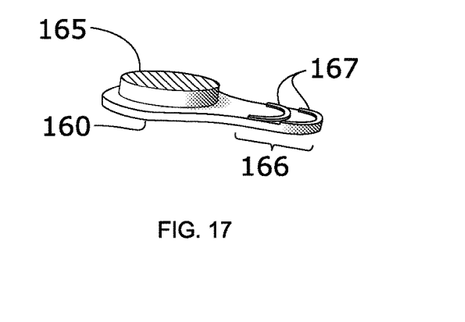
FIG. 17 is a perspective view of shank 165 and button 160, the shank cut at cut line 17-17 and perspective direction shown in FIG. 15.

With reference to FIGS. 9-14, wrap 100 may enclose a food article 200 (or other article) as follows. As illustrated in FIG. 9, wrap 100 naturally lays flat in its unfastened state and food article 200 may be placed on the inside surface of central section 110. Next, as illustrated in FIG. 10, south section 140 is folded over food article 200 at or around fold line 141, exposing button 160 to the user. Then, as illustrated in FIG. 11, east section 130 is folded over section 140 at or along fold line 131 so that one of east eyelet 132a or east eyelet 132b aligns with button 160. As illustrated, east eyelet 132a has been slipped over and captured by button 160 enabled by elastic deformation of the sheet material and is secured around shank 165 (eyelet and shank not visible in this view). Likewise, as illustrated in FIG. 12, west section 150 is folded over both south section 140 and east section 130 at or along fold line 151 so that one of west eyelet 152a or west eyelet 152b aligns with button 160. As illustrated, west eyelet 152a has been slipped over button 160 enabled by the elastomeric properties of the sheet material and is secured around shank 165 (eyelet and shank not visible in this view). Finally, as illustrated in FIGS. 13 and 14, north section 120 is folded down over west section 150, east section 130 and south section 140 so that one of the eyelets in north section 120 aligns with button 160 and the aligned eyelet is slipped over button 160 enabled by the sheet material elastomeric properties. As illustrated, north eyelet 122c is secured around shank 165 (eyelet and shank not visible in this view).

The two and three eyelets on the north, east, and west sections also give the invention a certain amount of adjustability to accommodate various sized articles. For a large article, the user would use the eyelets closest to the edges to create the maximum sized enclosure. For a smaller item, the user would use the innermost eyelets.

Figures 19A, 19B:
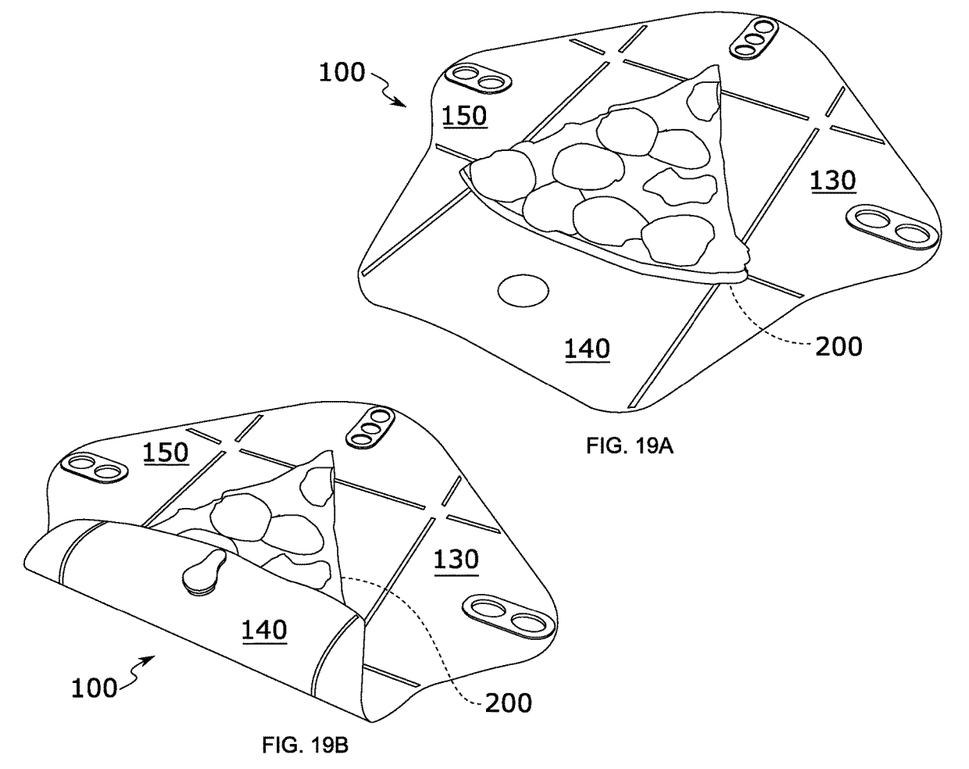
FIGS. 19A-D illustrate an alternative folding arrangement.
Figure 19C:
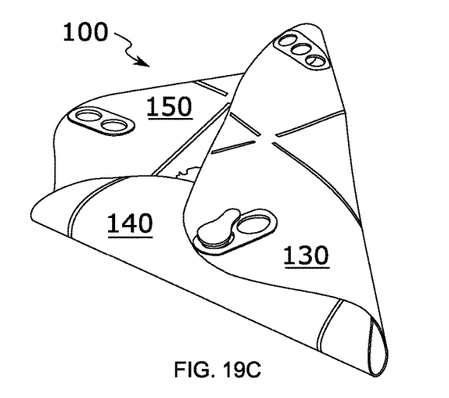
Figure 19D:
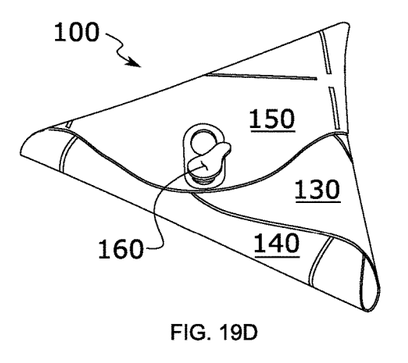

As illustrated in FIGS. 19A-D, wrap 100 can also be folded in a triangle configuration suitable for holding a triangular item such as a slice of pizza. This can be accomplished by allowing the item 200 to encroach into south section 140 as shown in FIG. 19A prior to folding it over the item as shown in FIG. 19B, and then folding east section 130 over the item as shown in FIG. 19C, and then folding west section 150 to meet button 160 at a lower point, thereby forming a triangle-shaped enclosure.

With reference to FIG. 1, wrap 100 can include imprinted indicia of fold direction and sequence such as south indicia 143 bearing an arrow and number "1", indicating a first folding of south section 140 northward, east indicia 133 and west indicia 153 bearing an arrow and number "2", indicating second folds of east section 130 and west section 150 central-ward, and finally north indicia 123 bearing an arrow and number "3", indicating a third folding of north section 120 southward. In one embodiment, as illustrated, the number of eyelets and buttons is indicia of folding order. That is, with one button 160 on south section 140, two eyelets on both the east and west section 130 and 150, and finally three eyelets on north section 120, the user has a built-in "one, two, two, three." Indicia may be printed onto or may be relief molded/embossed into wrap 100. In addition to printed or molded indicia 133, 143, and 153, other matter such as branding and advertising can be included. In one embodiment a sponsor advertisement 190 is imprinted.

Button 160 can be non-circular in cross section. For example, with reference to FIGS. 10-17, button 160 can include a tab section 166. Additionally, tab section 166 can include traction ridges 167. A tab section helps to avoid undue pressure on the article being wrapped when wrap 100 is being fastened; a user can hold tab section 166 while pushing an eyelet fully over button 160, thereby limiting application of force only to the wrap and not to the article. A surprising clicking noise is achieved by the linear pulling of tab section 166 on button 160. As button 160 passes through an eyelet, the wrap plane that contains the eyelet initially catches on button 160 and stores up energy like a stretched rubber band. When the potential energy exceeds the static friction between button 160 and the eyelet, the eyelet plane accelerates toward the plane of shank 165. When the eyelet plane and shank 165 meet, there is a snapping or clicking noise. This noise is an auditory and kinesthetic feedback that is pleasing to the user and indicative of satisfactory fastening.

Figure 18A:
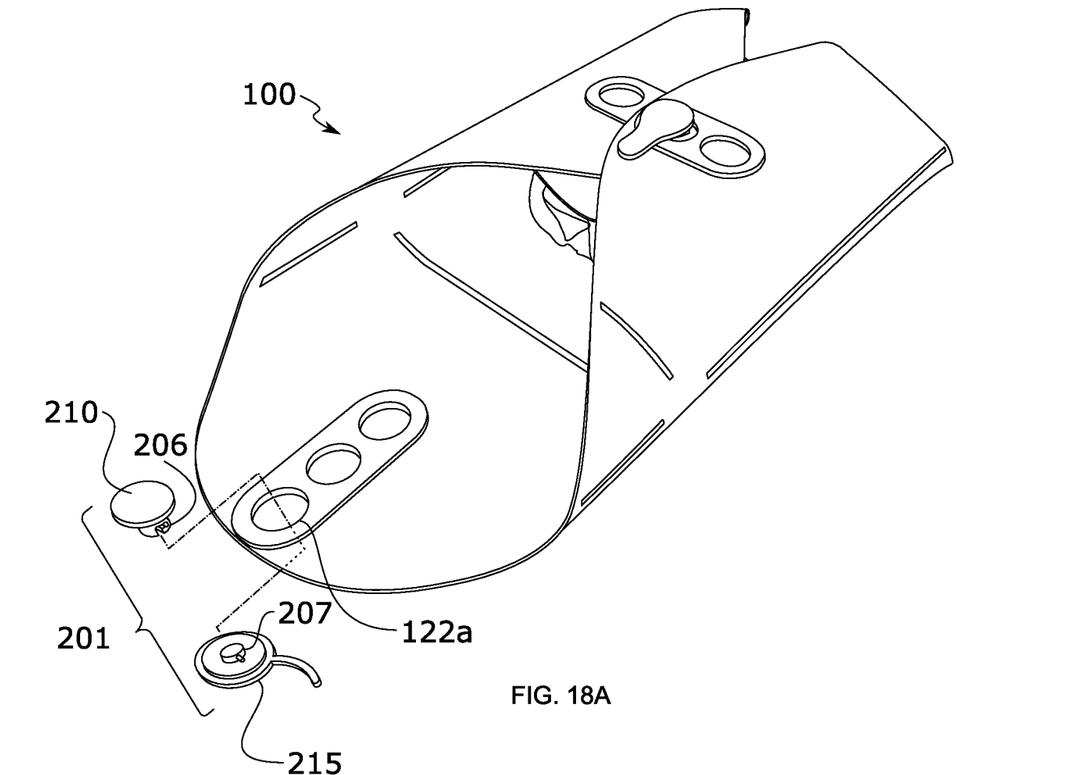
FIG. 18A is an exploded perspective view of a wrap (prior to final folding) and separable personality button.
Figure 18B:
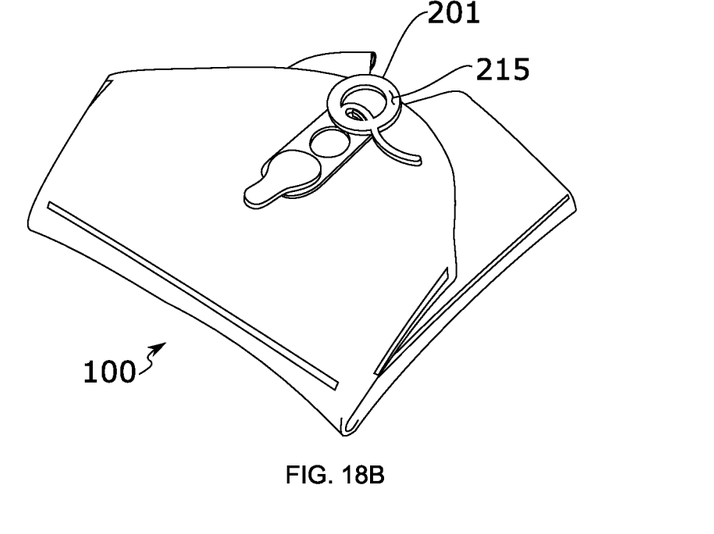
FIG. 18B illustrates the wrap and attached personality button after the final fold.
Figure 18C:
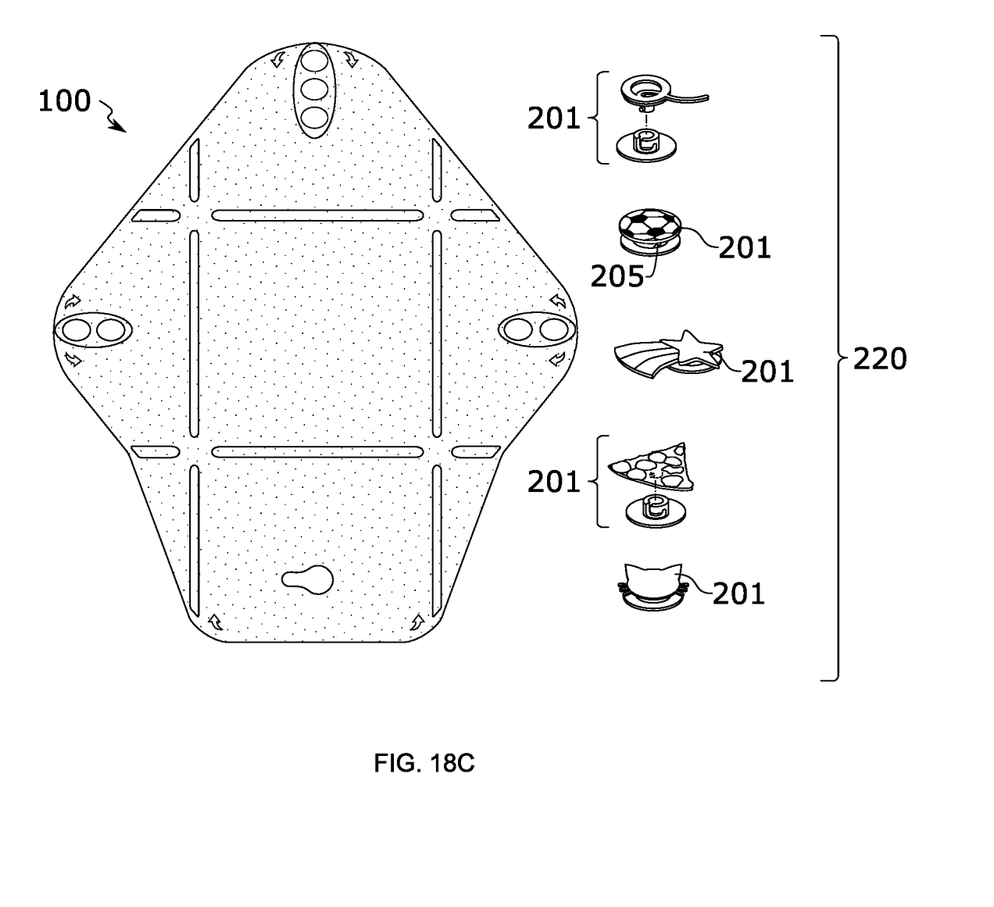
FIG. 18C illustrates a kit comprising personality buttons and a wrap.

With reference to FIGS. 18A-C, in some embodiments, the wrap 100 may be personalized with a personality button 201. A personality button 201 comprises a shoulder 210 and a button head 215. Button head 215 may comprise a monogram, a charm, a logo, a character, a trademark, or other design that can serve to personalize and identify a wrap 100 with its owner or user. In some embodiments, shoulder 210 and button head 215 are connected by a separable locking mechanism having shoulder section 206 and button head section 207, similar to those disclosed in U.S. Pat. No. 8,782,814, hereby incorporated by reference, so that the personality button may be attached to a wrap 100 through an eyelet without need for elastic deformation of the eyelet. In other embodiments, a shaft 205 is a single part connecting shoulder 210 and button head 215, and is dimensioned to fit snuggly within an eyelet of wrap 100 in a manner similar to shank 165. Similar to button 160, the shoulder 210 and button head 215 are larger in at least one dimension so that the personality button 201 may be captured in an eyelet, but not so large that an eyelet cannot be elastically deformed over either the shoulder 210 or button head 215. In some embodiments, a kit 220 includes one or more wraps 100, and one or more personality buttons 201.

Wrap 100 is formed of an elastomeric material. In one embodiment, the material is silicone rubber. Wrap 100 can be produced using a single mold process with silicone rubber. Once molded and cured into silicone rubber, wrap 100 is dishwasher and food safe as well as moisture-proof and heat resistant up to at least 200 C, as well as being nonstick to make clean up easier than traditional materials. In one embodiment, the silicone rubber has a hardness (JIS) in the range of 48-52° A, a specific gravity at 25° C. (ISO2781) in the range of 1.12 to 1.18 $g/cm^3$, a minimum tensile strength (ISO/DIS-37) of 7.5 Mpa, a minimum tear strength, DieC (ISO34) of 12 Kgf/cm, and a plasticity (ISO7323) in the range of 205-235. Unlike some silicone products that are promoted as dishwasher safe, wrap 100 is also dishwasher friendly. That is, wrap 100 may be implemented without enclosed surfaces and deep cracks where food or other materials can be problematically trapped away from a dishwasher's jets. The skilled artisan will readily appreciate that alternatives to silicone may be used, including elastomers that are elastic and have a high failure strain, which includes rubber-like and silicone-like products. For example, elastomers having minimum tensile and tear strengths and plasticity would be suitable.

What is claimed is:

1. A fastenable wrap for food or other article comprising:
   an elastomeric sheet configured to lay substantially flat on a flat surface when the wrap is in an open configuration, the sheet having inside and outside surfaces, the sheet further having:
      a substantially rectangular central section bounded by north, east, south, and west edges;
      a south section contiguous to the south edge of the central section, the south section having a shank disposed distal to the central section and extending away from the outside surface and a button disposed at a distal end of the shank;
      a north section contiguous to the north edge of the central section, the north section having three eyelets disposed increasingly distally to the central section;
      an east section contiguous to the east edge of the central section, the east section having two eyelets disposed increasingly distally to the central section;
      a west section contiguous to the west edge of the central section, the west section having two eyelets disposed increasingly distally to the central section;
      a northeast section contiguous to the north and east sections;
      a southeast section contiguous to the south and east sections;
      a southwest section contiguous to the south and west sections; and
      a northwest section contiguous to the north and west sections;
   wherein each said eyelet is sized to be elastically deformable over the button and sized to fit onto the shank and be captured around the shank between the button and the outside surface of the south section; and
   wherein the wrap is configured to be fastened in a closed configuration around the food or other article by placing the food or other article on the inside surface of the central section, folding the south section over article, folding the east section over the central section and slipping one of the east section eyelets over the button, folding the west section over the central section and slipping one of the west section eyelets over the button, and folding the north section over the central section and slipping one of the north section eyelets over the button.

2. The fastenable wrap of claim 1 further comprising imprinted indicia of folding sequence and direction proximate to the south edge of the south section, proximate to the eyelets of each of the north, west, and east sections.

3. A fastenable wrap for food or other article comprising:
an elastomeric sheet configured to lay substantially flat on a flat surface when the wrap is in an open configuration, the sheet having inside and outside surfaces, the sheet further having:
  a substantially rectangular central section bounded by north, east, south, and west edges;
  a south section contiguous to the south edge of the central section, the south section having a shank disposed distal to the central section and extending away from the outside surface and a button disposed at a distal end of the shank;
  a north section contiguous to the north edge of the central section, the north section having at least one eyelet disposed distally to the central section;
  an east section contiguous to the east edge of the central section, the east section having at least one eyelet disposed distally to the central section;
  a west section contiguous to the west edge of the central section, the west section having at least one eyelet disposed distally to the central section;
  a northeast section contiguous to the north and east sections;
  a southeast section contiguous to the south and east sections;
  a southwest section contiguous to the south and west sections; and
  a northwest section contiguous to the north and west sections;
wherein each said eyelet is sized to be elastically deformable over the button and sized to fit onto the shank and be captured around the shank between the button and the outside surface of the south section; and
wherein the wrap is configured to be fastened in a closed configuration around the food or other article by placing the food or other article on the inside surface of the central section, folding the south section over article, folding the east section over the central section and slipping one of the east section eyelets over the button, folding the west section over the central section and slipping one of the west section eyelets over the button, and folding the north section over the central section and slipping one of the north section eyelets over the button.

4. The fastenable wrap of claim 3 wherein the sheet has a general uniform thickness and the sheet has a thicker thickness than the general uniform thickness proximal to the eyelets and shank.

5. The fastenable wrap of claim 4 wherein the sheet has a thickness thinner than the general uniform thickness in areas proximal to sheet fold lines as defined by linear extensions of the east, west, north, and south edges of the central section, excepting intersections of said fold lines with each other and edges of the sheet.

6. The fastenable wrap of claim 5 further comprising imprinted indicia of folding sequence and direction proximate to the south edge of the south section, proximate to the eyelets of each of the north, west, and east sections.

7. The fastenable wrap of claim 5 wherein the general thickness is approximately 1 mm, the thinner thickness is approximately 0.5 mm, and the thicker thickness is approximately 1.5 mm.

8. The fastenable wrap of claim 5 wherein the thickness thinner than the general uniform thickness in areas proximal to sheet fold lines comprises channels 0.28-0.32 cm in width.

9. The fastenable wrap of claim 5 wherein the eyelets are ovoid.

10. The fastenable wrap of claim 5 wherein the central section is approximately 16-18 cm on each of its north, east, south, and west edges.

11. The fastenable wrap of claim 5 wherein the button comprises a tab.

12. The fastenable wrap of claim 11 wherein the tab has grip ridges.

13. The fastenable wrap of claim 11 comprising molded advertising on a surface thereof.

14. The fastenable wrap of claim 5 wherein the eyelets, button, and shank are configured to audibly and kinesthetically snap when one of the eyelets is slipped over the button and onto the shank.

15. The fastenable wrap of claim 3 wherein the sheet has a general uniform thickness and the sheet has a thinner thickness than the general uniform thickness in areas proximal to sheet fold lines as defined by linear extensions of the east, west, north, and south edges of the central section, excepting intersections of said fold lines with each other and edges of the sheet.

16. The fastenable wrap of claim 3 comprising silicone rubber.

17. The wrap of claim 3 formed of silicone rubber and having a tensile strength of at least 7.5 Mpa, a Tear Strength, DieC of at least 12 Kgf/cm, and a plasticity in the range of 205-235.

18. The wrap of claim 3 formed of silicone rubber and having a plasticity in the range of 205-235 and a Tear Strength, DieC of at least 12 Kgf/cm.

19. A kit comprising: a plurality of fastenable wraps as claimed in claim 3 and a plurality of non-identical personality buttons.

20. A personalized wrap comprising: the fastenable wrap as claimed in claim 3 and a personality button.

* * * * *